United States Patent
Iyer et al.

(10) Patent No.: US 7,370,133 B2
(45) Date of Patent: May 6, 2008

(54) STORAGE CONTROLLER AND METHODS FOR USING THE SAME

(75) Inventors: Venkidesh K. Iyer, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 11/038,711

(22) Filed: Jan. 20, 2005

(65) Prior Publication Data

US 2006/0161706 A1   Jul. 20, 2006

(51) Int. Cl.
    *G06F 13/36* (2006.01)
(52) U.S. Cl. .................... 710/310; 710/22; 710/55; 710/57; 710/308
(58) Field of Classification Search .......... 710/22, 710/23, 27, 31–35, 39, 52, 55–57, 62, 110, 710/305–306, 308, 310–311, 313–315
    See application file for complete search history.

(56) References Cited

U.S. PATENT DOCUMENTS

| | | | |
|---|---|---|---|
| 6,175,889 B1 * | 1/2001 | Olarig ..................... 710/309 |
| 6,425,024 B1 * | 7/2002 | Kelley et al. ............. 710/56 |
| 6,457,077 B1 * | 9/2002 | Kelley et al. ............. 710/56 |
| 6,694,397 B2 * | 2/2004 | Lackey et al. ............ 710/112 |
| 6,697,904 B1 * | 2/2004 | Bennett .................... 710/309 |
| 6,715,011 B1 * | 3/2004 | Buckland et al. ......... 710/100 |
| 6,968,418 B2 * | 11/2005 | Wollbrink et al. ........ 710/310 |
| 7,051,145 B2 * | 5/2006 | Butler et al. ............. 710/305 |
| 2002/0078282 A1 * | 6/2002 | Drerup et al. ............. 710/107 |
| 2004/0249997 A1 * | 12/2004 | Umberhocker et al. .... 710/29 |
| 2005/0235072 A1 * | 10/2005 | Smith et al. ............... 710/22 |

OTHER PUBLICATIONS

Definition of PCI-X Bus, www.interfacebus.com.*
DMA: What it is and How it Works, FreeBSD Developers' Handbook, Copyright 1995, 1997.*
Definition of PCI-X Bus, www.interfacebus.com, unknown date.*

* cited by examiner

*Primary Examiner*—Khanh Dang
(74) *Attorney, Agent, or Firm*—Dugan & Dugan (57) ABSTRACT

In a first aspect, a first method is provided for processing a request. The first method includes the steps of (1) receiving a request in first logic of a controller from a device master; (2) issuing a response to the device master to reissue the request at a later time; (3) notifying second logic of the controller of the request; (4) determining at least one of whether the request is valid and enough buffers are available to complete the request; (5) programming a filtering pipe; and (6) responding to the first logic based on at least one of whether the request is valid and enough buffers are available to complete the request such that the first logic may employ the filtering pipe to complete the request. The first logic operates in a first clock domain and second logic operates in a second clock domain. Numerous other aspects are provided.

16 Claims, 3 Drawing Sheets

STORAGE CONTROLLER AND METHODS FOR USING THE SAME

FIELD OF THE INVENTION

The present invention relates generally to computer systems, and more particularly to a storage controller and methods for using the same.

BACKGROUND

In a conventional computer system a storage controller may be coupled to memory and a bus from which requests to write data to and/or read data from the memory may be received. When the storage controller receives such a request, the controller performs processing, such as checking for free buffers and translating an address associated with the request. During this time other requests may be prevented from accessing the bus. Further, in certain specifications, such as PCI, data transferred on the bus while writing data to and/or reading data from the memory may be disconnected along any boundary. Consequently, the storage controller of such a computer system may not provide for efficient data transfer.

SUMMARY OF THE INVENTION

In a first aspect of the invention, a first method is provided for processing a request. The first method includes the steps of (1) receiving a request in first logic of a controller from a device master; (2) issuing a response to the device master to reissue the request at a later time; (3) notifying second logic of the controller of the request; (4) determining at least one of whether the request is valid and enough buffers are available to complete the request; (5) programming a filtering pipe; and (6) responding to the first logic based on at least one of whether the request is valid and enough buffers are available to complete the request such that the first logic may employ the filtering pipe to complete the request. The first logic operates in a first clock domain and the second logic operates in a second clock domain.

In a second aspect of the invention, a second method is provided for processing a request. The second method includes the steps of (1) receiving a read or write request from a requestor in first logic of a controller via a PCI-X bus; (2) issuing a response from the first logic to the requestor to reissue the read or write request at a later time; (3) notifying second logic of the controller of the read or write request; (4) determining whether the second logic may perform the read or write request; (5) programming a filtering pipe; (6) responding to the first logic based on whether the second logic may perform the read or write request such that the first logic may employ the filtering pipe to complete the request; (7) receiving a reissued read or write request from the requestor in the first logic via the PCI-X bus; and (8) based on the response to the first logic, responding to the reissued read or write request received by the first logic by aborting the read or write request, requesting the reissued read or write request be reissued or executing the read or write request, wherein executing the read request includes issuing a split response to the requestor by the first logic, notifying the second logic of the issued split response and transferring data from the second logic at a later time, thereby completing the request.

In a third aspect of the invention, a first apparatus is provided for processing a request. The first apparatus includes a memory; (2) a device master; (3) a controller, including first logic operating in a first clock domain and second logic operating in a second clock domain and coupled to the device master and memory. The controller is adapted to (a) receive a request in the first logic of the controller from the device master; (b) issue a response to the device master to reissue the request at a later time; (c) notify the second logic of the controller of the request; (d) determine at least one of whether the request is valid and enough buffers are available to complete the request; (e) program a filtering pipe; and (f) respond to the first logic based on at least one of whether the request is valid and enough buffers are available to complete the request such that the first logic may employ the filtering pipe to complete the request.

In a fourth aspect of the invention, a second apparatus is provided for processing a request. The second apparatus includes (1) a memory; (2) a PCI-X bus; (3) a chip for serving as a requestor; (4) a controller, including first and second logic, coupled to the device master via the PCI-X bus and coupled to the memory. The controller is adapted to (a) receive a read or write request from the requestor in the first logic of the controller via the PCI-X bus; (b) issue a response from the first logic to the requestor to reissue the read or write request at a later time; (c) notify the second logic of the controller of the read or write request; (d) determine whether the second logic may perform the read or write request; (e) program a filtering pipe; (f) respond to the first logic based on whether the second logic may perform the read or write request such that the first logic may employ the filtering pipe to complete the request; (g) receive a reissued read or write request from the requestor in the first logic via the PCI-X bus; and (h) based on the response to the first logic, respond to the reissued read or write request received by the first logic by aborting the read or write request, requesting the reissued read or write request be reissued or executing the read or write request, wherein executing the read request includes issuing a split response to the requestor by the first logic, notifying the second logic of the issued split response and transferring data from the second logic at a later time, thereby completing the request. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for processing a request received, for example, from a PCI-X bus. More specifically, according to the present methods and apparatus a server, computer, or the like, may include a controller (e.g., storage controller) having first and second logic. The first logic may receive a request from a device master coupled to the server via the PCI-X bus. Upon receiving such request, the first logic may issue a response to the device master to reissue the request at a later time. Additionally, the first logic may notify the second logic of the request from the device master. In response, the second logic may determine whether the request from the first logic is valid, and if so, whether enough buffers are available for the storage controller to complete the request. The second logic may program a filtering pipe (described below) and respond to the first logic based on the above determination(s) such that the first logic may use the filtering pipe to complete the request. Based on the response from the second logic, upon receiving the reissued request from the device master, the first logic may abort the request, request that the device master reissue the request again at a later time or complete the request. In this manner, the controller may allocate resources, such as memory buffers, only when available, thereby efficiently consuming resources and ensuring a correct response to a request.

In some embodiments, the first and second logic of the controller may operate in different clock domains. Further, the PCI-X bus specification requires either a response to retry a request received from the bus within eight clock cycles from the time of the request or a start of data transfer in response to the request within sixteen clock cycles from the time of the request. Additionally, according to the PCI-X bus specification, data transfer for a write operation may only disconnect (e.g., be preempted) on a 128-byte boundary and all data must be transferred for a data read operation without preemption. The present methods and apparatus may enable the server, computer or the like to process a request while complying with such PCI-X bus specifications and allowing the request to be processed across the different clock domains of the controller.

For example, rather than issuing a response to retry a request received from a device master only when a required buffer is full, as recommended by the PCI-X specification, the present methods and apparatus may issue a response to retry many requests (e.g., every request) from a device master, thereby allowing the present methods and apparatus to determine (e.g., in the background) whether such request may be allowed to execute when the reissued request is received from the device master. More specifically, according to the present methods and apparatus, a storage controller may include first logic operating in a first clock domain. The first logic of the storage controller is coupled to the device master, which also operates in the first clock domain, via a PCI-X bus. Further, the storage controller includes second logic, which operates in a second clock domain (e.g., a clock domain of a memory bus), coupled to the first logic, thereby defining an asynchronous boundary between the first and second logic. When the first logic of the storage controller receives a read or write request from a device master via the PCI-X bus, the first logic issues a response to the device master to reissue the request, and notifies the second logic across the asynchronous boundary of the request from the device master. In response, the second logic may determine whether the request from the first logic is valid, and if so, whether enough buffers are available for the storage controller to complete the request. The second logic will program a filtering pipe and respond to the first logic across the asynchronous boundary based on the above determination(s) such that the first logic may use the filtering pipe to complete the request. Based on the response from the second logic, upon receiving the reissued request from the device master in the first clock domain, the first logic may abort the request, request that the device master reissue the request again at a later time, or complete the request by transferring data across the asynchronous boundary.

Figure 1:
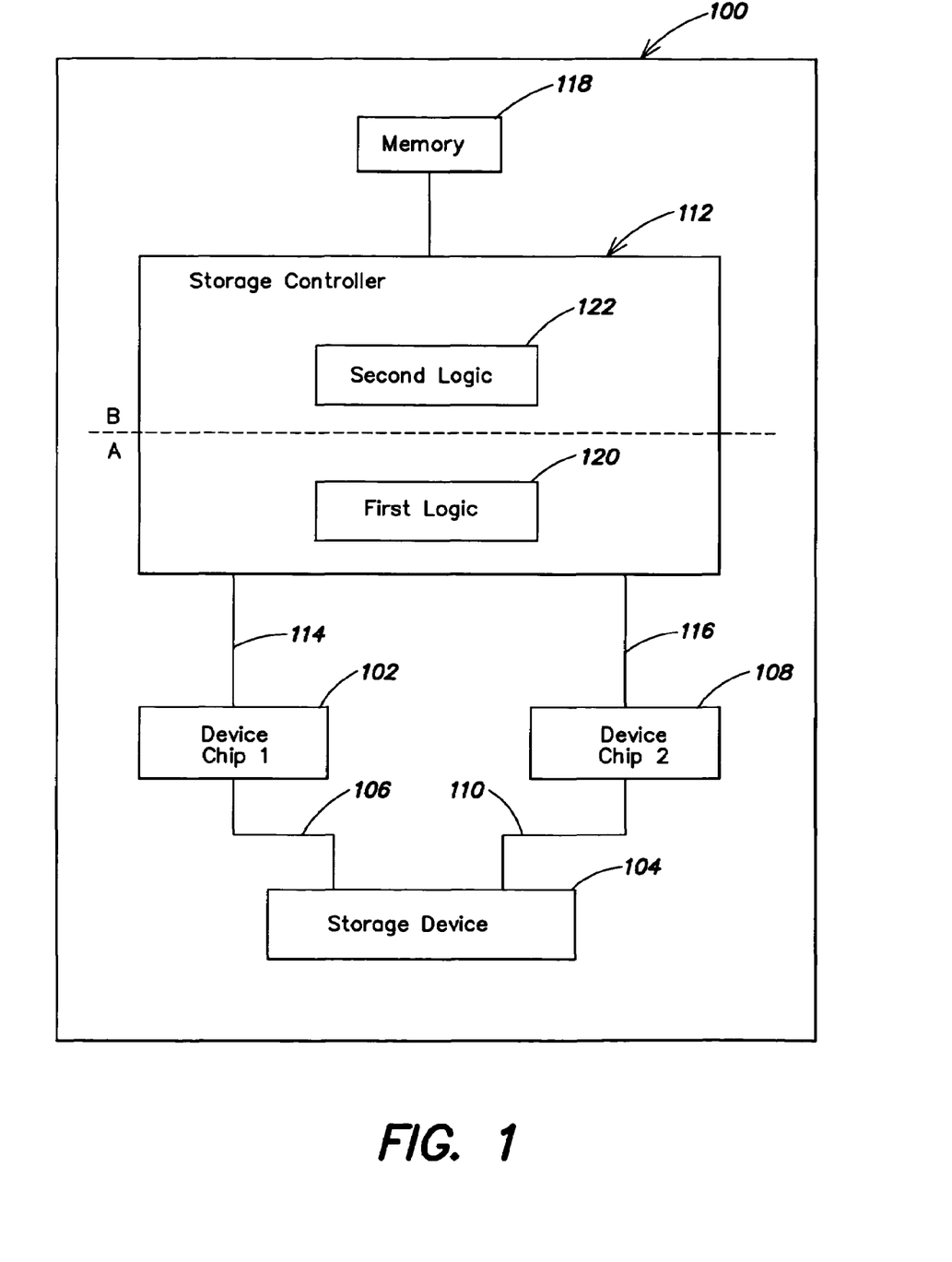
FIG. 1 is a block diagram of an apparatus for processing a request in accordance with an embodiment of the present invention.

FIG. 1 is a block diagram of an apparatus for processing a request in accordance with an embodiment of the present invention. With reference to FIG. 1, the apparatus 100 may be a server, computer system or the like. The apparatus 100 may include at least one device chip coupled to a storage device (e.g., a hard disk or the like) via a respective bus, such as a small component system interface (SCSI) bus. For example, the apparatus 100 may include first device chip 102 coupled to a storage device 104 via a first SCSI bus 106 and a second device chip 108 coupled to the storage device 104 via a second SCSI bus 110. Although the first 102 and second device chips 108 are coupled to the same storage device 104, in some embodiments, the first 102 and second device chips 108 may be coupled to different storage devices, respectively. Each device chip 102, 108 is adapted to write data to and/or read data from a storage device 104 to which the device chip 102, 108 is coupled.

The first device chip 102 may be coupled to a controller 112 (e.g., storage controller) via a first bus operating in PCI-X mode (e.g., a first PCI-X bus 114), which serves as a local bus. Similarly, the second device chip 108 may be coupled to the controller 112 via a second bus operating in PCI-X mode (e.g., a second PCI-X bus 116) that serves as a local bus. The controller 112 may be coupled to one or more memories 118 (only one shown), and is adapted to provide a device chip 102, 108 with access to such memory 118. More specifically, each device chip 102, 108 may include or serve as a direct memory access (DMA) engine that may initiate a data transfer (e.g., by issuing a request to write data to and/or read data from the one or more memories 118) on a PCI-X bus 114, 116 to which the device chip 102, 108 is coupled, thereby serving as a device master.

The controller 112 is adapted to receive such request from a device chip 102, 108 via the PCI-X bus 114, 116 to which the device chip 102, 108 is coupled and process the request within time periods specified by the PCI-X specification (e.g., PCI-X Protocol Addendum to the PCI local bus specification Revision 2.0a). More specifically, upon receiving a request from a device chip 102, 108 to read or write data, if the controller 112 determines it will be unable to start a data transfer between the memory 118 and device chip 102, 108 within a first predetermined time period (e.g., sixteen clock cycles), the controller 112 is adapted to respond to the device chip 102, 108 within a second predetermined time period (e.g., eight clock cycles) by requesting the device chip 102, 108 reissue the request at a later time. Further, upon receiving a request reissued by the device chip 102, 108 in a later time period, the controller 112 may be adapted to respond to such reissued request by (1) aborting the request (e.g., if the request is determined to be invalid); (2) requesting the device chip 102, 108 reissue the reissued request at a later time period; or (3) transferring data between the memory 118 and the device chip 102, 108. The controller 112 may include any suitable combination of logic, registers, memory or the like, and in at least one embodiment, may comprise or be part of an application specific integrated circuit (ASIC).

In some embodiments, the device chip 102, 108 operates in a first clock domain A, such as 66, 100 or 133 MHz, and the memory 118 operates in a second clock domain B, such as 333 MHz. However, the frequency of the first A and/or second clock domains B may be larger or smaller. The controller 112 may be adapted to operate in the first A and second clock domains B. More specifically, the storage controller 112 includes first logic 120 adapted to operate in the first clock domain A. For example, the first logic 120 is adapted to receive a request to read data from and/or write data to the memory 118 from a device chip 102, 108 and respond to such requests. Further, the storage controller 112 includes second logic 122 adapted to operate in the second clock domain B. For example, the second logic 122 is adapted to transfer data to and/or from the memory 118, for example, via a memory interface (not shown). In this manner, the first 120 and second logic 122 define an asynchronous boundary between themselves, and the controller 112 is adapted to process requests across such boundary. Details of the controller 112 are described below with reference to FIG. 2.

Figure 2:
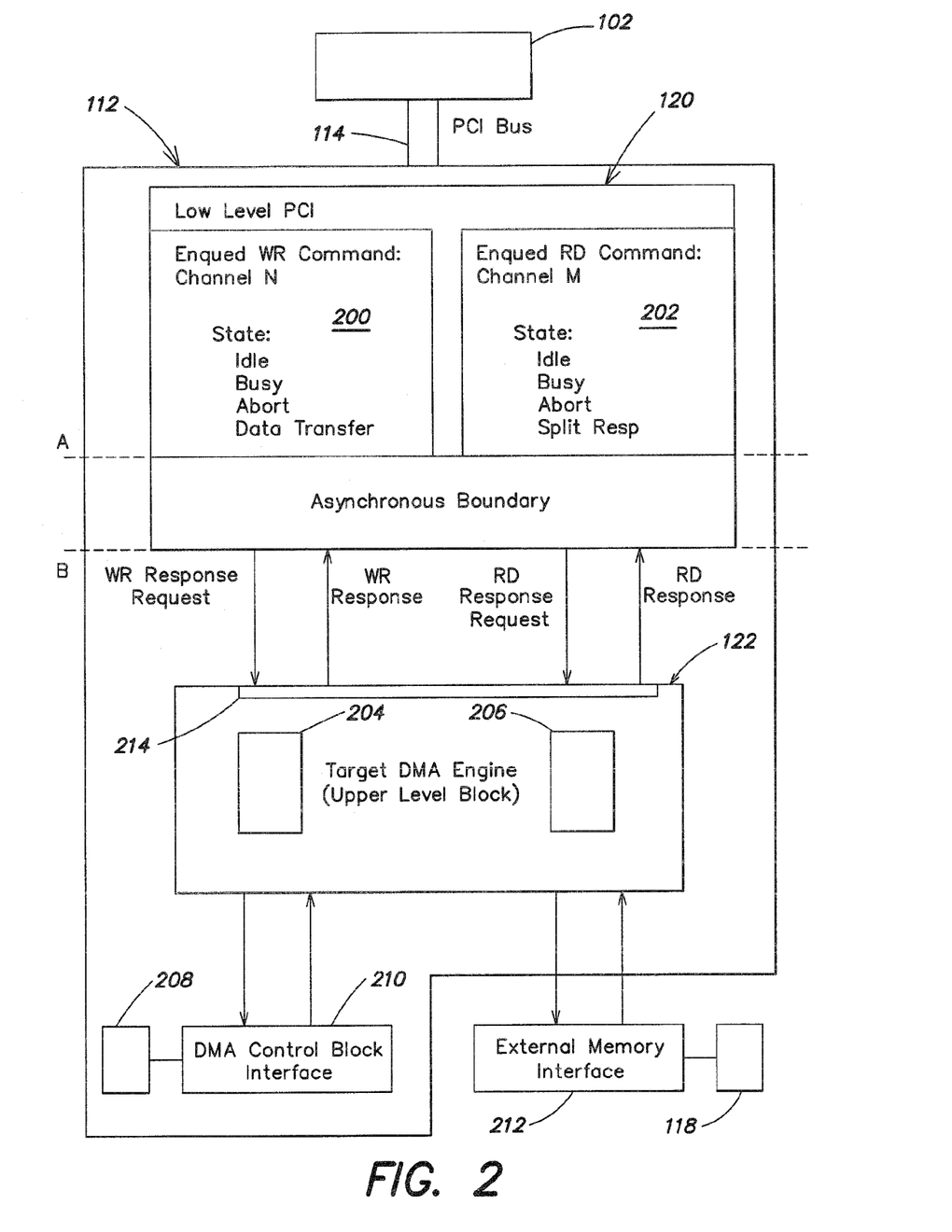
FIG. 2 is a block diagram of a controller included in the apparatus for processing a request in accordance with an embodiment of the present invention.

FIG. 2 is a block diagram of a controller included in the apparatus for processing a request in accordance with an embodiment of the present invention. With reference to FIG. 2, the first logic 120 of the controller 112 may include a plurality of channels for receiving a request from a device master 102, 108 (only one shown) via the PCI-X bus 114, 116 (only one shown). For example, the first logic 120 may include a first channel 200 for receiving a request to write data to the memory 118. The first channel 200 may include logic for storing data indicating a state of the first channel 200. Possible states of the first channel 200 include (1) idle; (2) busy; (3) abort; and (4) data transfer. Similarly, the first logic 120 may include a second channel 202 for receiving a request to read data from the memory 118, which may include logic for storing data indicating a state of the second channel 202. Possible states of the second channel 202 include (1) idle; (2) busy; (3) abort; and (4) split response (split resp). Such states of the first 200 and second channels 202 may indicate how the controller 112 will respond to a read or write request received from a device master 102, 108 via a PCI-X bus 114, 116. Details of such states are described below with reference to FIG. 3. Although the first logic 120 includes a channel 200 for receiving a request to write data and a channel 202 for receiving a request to read data, a larger number of channels for receiving a request to read data and/or for receiving a request to write data may be employed. For example, the first logic 120 may include a channel for each function that may be specified by a request. In this manner, multiple channels for processing read and write requests may be employed such that request processing is pipelined, thereby improving performance. Separate handshaking signals may be employed for communications between each channel 200, 202 of the first logic 120 and the second logic 122.

The first logic 120 may be coupled to the second logic 122 across an asynchronous boundary. The first logic 120 is adapted to notify the second logic 122 when a request to read data from and/or write data to the memory 118 is received by a channel 200, 202, for example, by providing details of such request, and to request a response from the second logic 122. The second logic 122 may include one or more buffers (e.g., internal buffers) corresponding to each channel included in the first logic 120 from which a request to read data from and/or write data to the memory 118 may be received. For example, the second logic 122 may include a first internal buffer 204 corresponding the first channel 200 and a second internal buffer 206 corresponding to the second channel 202 (although a larger number of buffers may be employed). Such internal buffers 204, 206 may be employed for storing data read from the memory 118 or to be written to the memory 118.

The second logic 122 may be coupled to a memory 208 for storing information (e.g., in respective control blocks) about paths that may be associated with a request, for example, via a control block interface 210. Further, the second logic 122 may be coupled to the memory 118, such as an external DRAM, for example, via a memory interface 212. The second logic 122 is adapted to receive a request for response (e.g., response request) from the first logic 120, and in response, access the memory 208 for storing information about paths that may be associated with a request to determine whether such request is valid. Additionally, the second logic 122 may determine whether resources (e.g., buffers) are available for completing the request to read or write data received by the controller 112. The second logic 122 may program a filtering pipe 214 (described below) and based on whether the request is valid, and if so, based on whether resources are available to complete such request, the second logic 122 is adapted respond to the first logic 120 such that the first logic 120 may use the filtering pipe 214 to complete the request. Such response from the second logic 122 may be employed to set a state in the channel 200, 202 of the first logic 120 in which the request was received.

Figure 3:
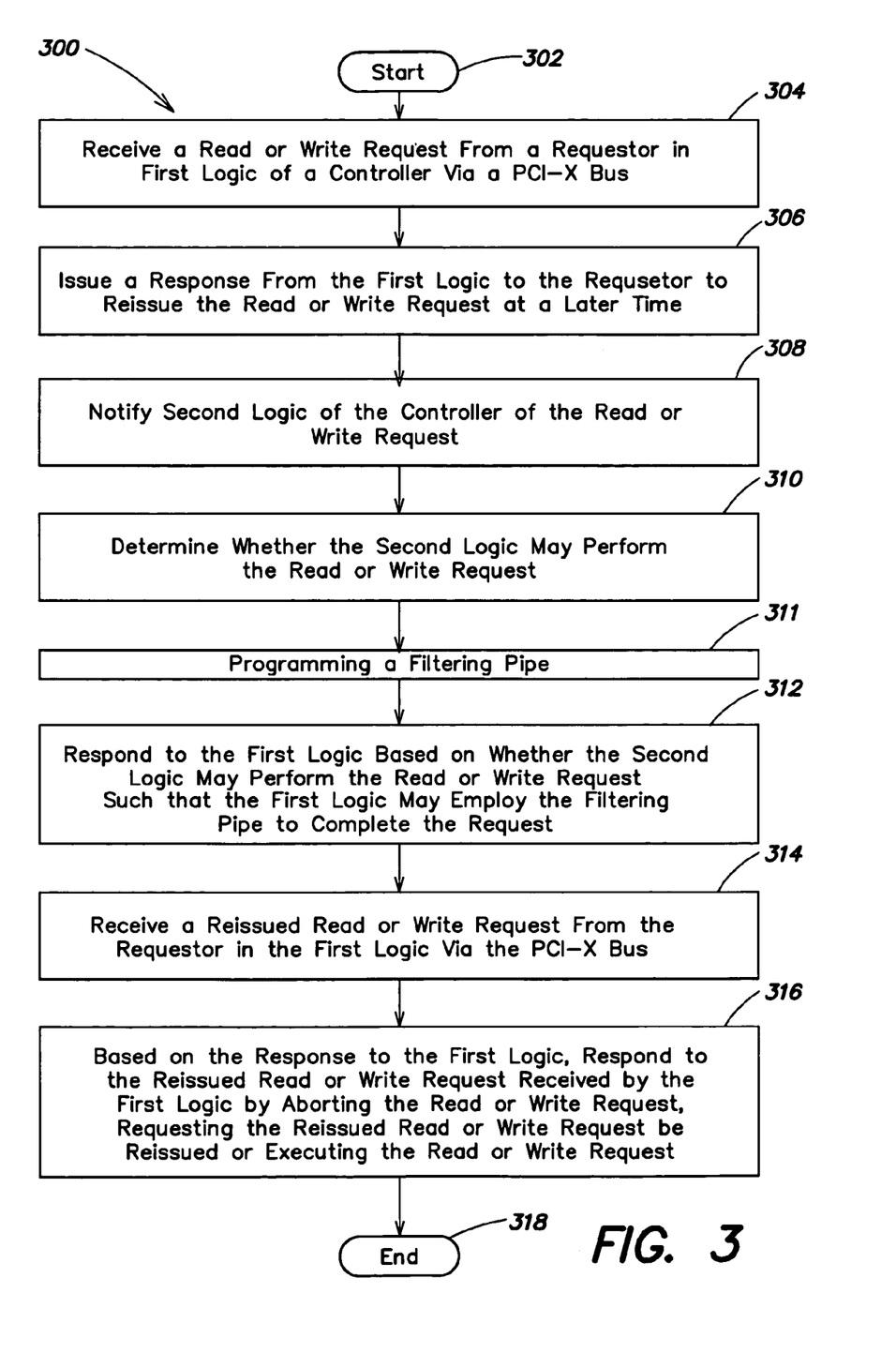
FIG. 3 is a method for processing a request in accordance with an embodiment of the present invention.

The operation of the apparatus for processing a request is now described with reference to FIGS. 1-2 and with reference to FIG. 3 which illustrates a method for processing a request in accordance with an embodiment of the present invention. With reference to FIG. 3, in step 302, the method 300 begins. In step 304, a read or write request from a requestor is received in first logic of a controller via a PCI-X bus. A request may include an address (e.g., memory address) to or from which data will be transferred, a size (e.g., byte count) of data to be transferred, and a direction (e.g., whether the request is a read or write request). In some embodiments, the request may include a larger or smaller amount and/or different information. For example, the request may include a path number specifying a function. A combination of a path and direction associated with a request may result in a unique identification for the request. If the first logic 120 receives a write request from a device master 102, 108 via a respective PCI-X bus 114, 116, the first logic 120 may store (e.g., enqueue) such command in the first channel 200 for receiving a request to write data to the memory 118. Before initially receiving such request, the first logic 120 may have set the state of the first channel to IDLE. Similarly, if the first logic 120 receives a read request from a device master 102, 108 via a respective PCI-X bus 114, 116, the first logic 120 may store (e.g., enqueue) such command in the second channel 202 for receiving a request to read data to the memory 118. Before initially receiving such request, the first logic 120 may have set the state of the second channel 202 to IDLE. Storing a request in a channel 200, 202 may include logging the identification and/or attributes associated with a request in the channel 200, 202.

When a channel 200, 202 is in idle state, in response to receiving a request from a device master 102, 108 in the channel 200, 202, the storage controller 112 will respond by issuing a response to the device master 102, 108 to reissue the request at a later time (e.g., will retry the request) and setting the channel state to BUSY. While a channel state is BUSY, the first logic 120 will retry any requests received by the channel 200, 202. In this manner, only one request may be active in a channel 200, 202 at a time.

Therefore, in step 306, a response is issued from the first logic to the requestor to reissue the read or write request at a later time. For example, because a write request is received and stored in the first channel 200 while the first channel 200 is IDLE, in response, the first channel 200 may retry the write request. The first logic 120 may set the first channel to a BUSY state.

Similarly, if, in step 304, a read request is received, in step 306, the first logic 120 may issue a response to the requestor to reissue the read request at a later time. More specifically, because the read request is received and stored in the second channel 202 while the second channel 202 is IDLE, in response, the second channel 202 may retry the read request, and the first logic 112 may set the second channel 202 to a BUSY state. In this manner, the controller 112 may respond to requests received via the PCI-X bus 114, 116 within the time required by the PCI-X specification. For example, the controller 112 may retry a received request within a predetermined time period (e.g., the second predetermined time period, such as eight clock cycles).

Additionally, in step 308, the second logic of the controller is notified of the read or write request. For example, in response to receiving and storing a read or write request in a respective channel 200, 202, the first logic 120 notifies the second logic 202 of the read or write request. More specifically, upon receiving and storing a write request, the first channel 200 of the first logic 120 may issue a request for response (e.g., write response request) to the second logic 122. Along with the response request, the first channel 200 may send information about the request such as an address (e.g., memory address) to or from which data will be transferred, a size (e.g., byte count) of data to be transferred, a direction (e.g., whether the request is a read or write request), and/or a path number specifying a function. Similarly, in response to receiving and storing a read request in the second channel 202, the first logic 120 notifies the second logic 122 of the read request by issuing a response request (e.g., a read response request) to the second logic 122. Along with such response request, the second channel 202 may send information about the read request such as an address (e.g., memory address) to or from which data will be transferred, a size (e.g., byte count) of data to be transferred, a direction, and/or a path number specifying a function.

In step 310, it is determined whether the second logic 122 may perform the read or write request. For example, the controller 112 may determine whether the request is valid, and if so, whether enough buffers are available to complete the request. More specifically, upon receiving information about the request from the first logic 120, the second logic 122 may access the memory 208 for storing information about paths that may be associated with a request to determine whether such request is valid. For example, the second logic 122 may fetch a control block (e.g., DMA path control block) stored in the memory 208. A DMA path control block holds information such as addresses to real buffers in the memory 118, statistics of available buffers, error information inside the chip, etc. In some embodiments, a DMA path control block includes a larger or smaller amount of data, and/or different information. In some embodiments, a DMA control block may be thirty-two bytes in size (although a larger or smaller size may be employed). The second logic 122 may determine whether a request is valid by accessing the DMA path control block corresponding to the path included in the request received by the controller 112. For example the second logic 122 may determine whether the DMA path control block, which corresponds to path included in the request received by the controller, includes error information. Additionally or alternatively, the second logic 122 may determine whether information (e.g., attributes) included in the request matches information included in the DMA path control block. For example, the second logic 122 may determine whether an address (e.g., flat address) and/or direction included in the request match corresponding information included in the DMA path control block. If the DMA path control block includes error information and/or information included in the request does not match information included in the DMA path control block, the second logic 122 determines the request is invalid, and therefore, the second logic 122 may not perform the request.

Alternatively, if the DMA path control block does not include error information and information included in the request matches information included in the DMA control block, the request may be valid. Therefore, the second logic 122 may determine whether enough resources (e.g., buffers) are available to transfer the size (e.g., byte count) included in the request. It should be noted during this time, the channel 200, 202 of the first logic 120 in which the request is received is BUSY, and therefore, the first logic 120 may retry any request received in the channel 200, 202.

In step 311, a filtering pipe may be programmed. The filtering pipe may be employed to perform filtering processing of data flow, such as building scatter gather lists for mapping data into proper locations of memory 118, performing logic XOR operations for providing error checking of data to be written in to memory 118, splitting a header, trailer and payload of data into separate buffers, performing data skip operations for skipping sectors while writing data, perform wrapping operations for transferring the data to wrapped buffers of the memory 118, and/or keeping track of a total count of data to be moved, etc.

In step 312, the first logic is responded to based on whether the second logic may perform the read or write request such that the first logic 120 may use the filtering pipe to complete the request. More specifically, if, in step 310, the second logic 122 determines the read or write request is invalid, the second logic 122 may respond to the channel 200, 202 from which the response request was received by issuing a target abort response. A target abort issued by the second logic 122 to the first logic 120 indicates the request received by the first logic 120 is invalid. Thereafter, the second logic 122 may be idle. When the first logic 120 receives the target abort response, the channel 200, 202 from which the response request was received is set to an ABORT state. While in the ABORT state, a channel 200, 202 may respond to a request (e.g., a reissued request) received from a requestor (e.g., device chip 102, 108) by issuing a response to the device chip 102, 108 to abort the request, thereby aborting the request.

Alternatively, if in step 310, the second logic 122 determines the read or write request is valid, however, enough resources are not available (e.g., currently) to complete the request (e.g., to transfer the size of data included in the request), the second logic 122 may respond to the channel 200, 202 from which the response request was received by issuing a retry response. A retry response indicates the request received by the channel is valid but resources are not currently available to complete the request. Thereafter, the second logic 122 may be idle. When the first logic 120 receives the retry response, the channel 200, 202 from which the response request was received is changed from the busy to an idle state. While in such state, a channel 200, 202 may respond to a request received from a device chip 102, 108 by issuing a response to the device chip 102, 108 to reissue the request at a later time, and thereafter, the first logic 120 will go to a busy state and steps 308-312 may be performed.

Alternatively, if in step 310, the second logic 122 determines the read or write request is valid and enough resources are available to complete the request, the second logic 122 may respond to the channel 200, 202 by indicating such. More specifically, if, in step 310, the second logic 122 determines a write request is valid and enough resources are available to complete the write request, the second logic 122 may respond to the channel from which the write request was received (e.g., the first channel 200) by issuing a data transfer response. Thereafter, the second logic 122 awaits an indication from the first logic 120 to start transferring data. When the first logic 120 receives a data transfer response, the channel 200 from which the write response request was received is changed from the busy to a data transfer state (e.g., DATA TRANSFER). While in the data transfer state, a channel 200 may respond to a write request (e.g., a reissued write request) received from a device chip 102, 108 by completing such write request.

Similarly, if, in step 310, the second logic 122 determines a read request is valid and enough resources are available to complete the read request, the second logic 122 may respond to the channel from which the read request was received (e.g., the second channel 202) by issuing a data transfer response. The data transfer response issued by the second logic 122 to the first logic 120 indicates the request (e.g., write or read) may be performed by the controller 100. Thereafter, the second logic 122 awaits an indication from the first logic 120 to start transferring data. When the first logic 120 receives a data transfer response, the channel 202 from which the read response request was received is changed from the busy to a data transfer state (e.g., SPLIT RESPONSE). While in SPLIT RESPONSE, a channel 202 may respond to a read request (e.g., a reissued read request) received from a device chip 102, 108 by issuing a split response. Thereafter, the first logic 120 may inform the second logic 122 of such event, and in response, the second logic 122 may transfer (e.g., DMA) the data at a later time. In this manner, the read request may complete.

In step 314, a reissued read or write request from the requestor is received in the first logic via the PCI-X bus. More specifically, after receiving a response from the first logic 120 to a previous read or write request (e.g., an initial read or write request) to reissue such request at a later time, a requestor, such as a device chip 102, 108, may reissue the read or write request on the PCI-X bus 114, 116 to which the requestor is coupled. The first logic 120 of the controller receives such request (e.g., the reissued request). More specifically, the channel 200, 202 of the first logic 120 identified by the reissued request receives such request.

In step 316, based on the response to the first logic, the reissued read or write request received by the first logic is responded to by aborting the read or write request, requesting the reissued read or write request be reissued or executing the read or write request. More specifically, as described above, in step 312, the second logic 122 responds to a request for response received from a channel 200, 202 of the first logic 120 by setting a state of such channel 200, 202. The first logic 120 may respond to a reissued request received in a channel 200, 202 based on the state of channel 200, 202. For example, if a channel 200, 202 in which a reissued read or write request is received is in abort state, the first logic 120 may respond to such request by issuing a request to the device chip 102, 108 from which the request was issued to abort the request. Thereafter, the first logic 120 may set the channel 200, 202 to an idle state.

Alternatively, if a channel 200, 202 in which a reissued read or write request is received is in an idle state, the first logic 120 may respond to such request by issuing a request to the device chip 102. 108 from which such request was received to reissue the request at a later time.

Alternatively, if a channel 200 in which a reissued write request is received is in a data transfer state, the first logic 120 may respond to such request by executing the request. More specifically, the first logic 120 may indicate to the device chip 102, 108 from which the request was received that the request will be executed, for example, by issuing a data transfer response on the PCI-X bus 114, 116. Additionally, the first logic 120 may notify (e.g., signal) the second logic 122 that the channel 200 issued a data transfer response on the PCI-X bus 114, 116, and to start a data transfer between the memory 118 and the device chip 102, 108 from which the request is received. Upon receiving such signal from the first logic 120, the second logic 122 may start transferring data. For example, data may be transferred from the channel 200 of the first logic to internal buffers 204, which correspond to the channel 200, and from such internal buffers 204 to the memory 118. The second logic 122 may build scatter gather lists for mapping data into proper locations of memory 118, perform logic XOR operations for providing error checking of data to be written in to memory 118, split a header, trailer and payload of data into separate buffers, perform data skip operations for skipping sectors while writing data, perform wrapping operations for transferring the data to wrapped buffers of the memory 118, and/or keep track of a total count of data to be moved, etc. The second logic 122 may transfer data from the internal buffers 204 to the memory 118 (e.g., to the real addresses on the memory 118). In this manner, the write request may be executed.

Alternatively, if a channel 202 in which a reissued read request is received is in a split response state, the first logic 120 may respond to such request by executing the request. More specifically, the first logic may indicate to the device chip 102, 108 from which the request was received that the request will be executed, for example, by issuing a split response response on the PCI-X bus 114, 116. Additionally, the first logic 120 may notify (e.g., signal) the second logic 122 that the channel 202 issued a split response response on the PCI-X bus 114, 116, and that the second logic 122 is to start a data transfer between the memory 118 and the device chip 102, 108 from which the request is received. Thereafter, the first logic 120 may go to an idle state. Upon receiving such signal from the first logic 120, the second logic 122 may start transferring data. For example, the second logic 122 may transfer data from the memory 118 to internal buffers 206 of the second logic 122, which correspond to the channel 202. The second logic 122 may perform filtering processing, such as building scatter gather lists for mapping data into proper locations of memory 118, splitting a header, trailer and payload of data into separate buffers, perform wrapping operations for transferring the data to wrapped buffers of the memory 118, and/or keep track of a total count of data to be moved, etc. Further, the first logic 120 may transfer data from the internal buffers 206 to the PCI-X bus 114, 116 from which the request was received. In this manner, the read request may be executed. More specifically, the read request may be performed as split transaction that may transfer the entire byte count included in the request.

While executing a read or write request received from a channel 200, 202 of the first logic 120, such channel 200, 202 remains in the data transfer state (e.g., DATA TRANSFER for a channel 200 for receiving a write request and SPLIT RESPONSE for a channel 202 for receiving a read request). If such channel 200, 202 receives another request while in a data transfer state, the controller 112 will retry the request. Once the read or write request completes (e.g., once a size or amount of data specified by the byte count included in request is transferred), the first logic 120 may set such channel 200, 202 to an idle state.

Thereafter, step 318 is performed. In step 318, the method 300 ends.

Through use of the method 300 of FIG. 3, an apparatus may process a request while complying with PCI-X bus specifications that require either a start of data transfer in response to the request within a first predetermined time period (e.g., sixteen clock cycles) from the time of the request or a response to retry a request received from the bus within a second predetermined time period (e.g., eight clock cycles) from the time of the request, require a data transfer for a write operation to only disconnect (e.g., be preempted) based on a predetermined value or boundary (e.g., 128-byte boundary), and require all data for a data read operation to be transferred without preemption. For example, the internal buffers 206 corresponding to a channel 202 for receiving a read request may be sized to store a burst of data (e.g., a 1 to 4 KB chunk of data), thereby enabling all data of a read request to be transferred without preemption. Additionally or alternatively, the present methods and apparatus allow a read or write request to be processed across different clock domains (e.g., of the controller 112). In the manner described above, the present methods and apparatus may transform, even transmogrify, a flat addressed PCIX burst transfer into an advanced DMA function. Therefore, in contrast to a conventional apparatus for processing a request, the present methods and apparatus do not prevent other requests from accessing (e.g., do not lockup) the bus while determining whether enough resources are available to satisfy a byte count included in a request on the bus, and do not commit channels of the controller if resources (e.g., buffers) are not available. Further, the present methods and apparatus may process (e.g., at the same time) a large number of requests (e.g., DMA requests) without negatively impacting performance.

The foregoing description discloses only exemplary embodiments of the invention. Modifications of the above disclosed apparatus and methods which fall within the scope of the invention will be readily apparent to those of ordinary skill in the art. For instance, a channel 200, 202, which is in a split response state, may await receipt of a reissued request via the PCI-X bus 114, 116. However, the request may not be reissued. Therefore, in some embodiments, a timer (e.g., discard or dead man timer) may be employed to reset the state of such channel 200, 202 (e.g., to idle) if the request is not reissued within a specified time period. When such timer expires, the second logic 122 is notified that data will not be transferred for the request. Similarly, a channel 200, 202 that is in an abort state may await receipt of a reissued request, which may not be reissued, via the PCI-X bus 114, 116. Therefore, in some embodiments, a timer (e.g., discard or dead man timer) may be employed to reset the state of such channel 200, 202 (e.g., to idle) if the request is not reissued within a specified time period. A similar timer may be employed by a channel 200 for receiving a write request. Use of such timers prevents the first logic 120 (e.g., channels 200, 202 of the first logic 120) from indefinitely remaining in one state. Further, although the above methods and apparatus are described with reference to a bus operating in PCI-X mode, the present methods and apparatus may be employed for a bus operating in another mode, which has some of the same requirements (e.g., the requirements mentioned above) as the PCI-X mode. In some embodiments, the controller 112 is a redundant array of inexpensive disks (RAID) controller.

Accordingly, while the present invention has been disclosed in connection with exemplary embodiments thereof, it should be understood that other embodiments may fall within the spirit and scope of the invention, as defined by the following claims.

The invention claimed is:

1. A method of processing a request, comprising:
receiving a request in first logic of a storage controller from a device master;
issuing a response to the device master to reissue the request at a later time;
notifying second logic of the storage controller of the request;
determining at least one of whether the request is valid and enough buffers are available such that the second logic may complete the request;
programming a filtering pipe; and
responding to the first logic based on at least one of whether the request is valid and enough buffers are available such that the second logic may respond to the request such that the first logic may employ the filtering pipe to complete the request;
wherein the first logic operates in a first clock domain and second logic operates in a second clock domain.

2. The method of claim 1 wherein receiving the request in first logic of the storage controller from a device master includes receiving the request in first logic of the storage controller from a device master via a PCI-X bus.

3. The method of claim 1 further comprising:
before responding to the first logic, receiving a second request in the first logic of the storage controller from a device master; and
issuing a response to the device master to reissue the second request at a later time.

4. The method of claim 1 further comprising:
receiving a reissued request from the device master in the first logic; and
responding to the reissued request based on the response to the first logic that is based on at least one of whether the request is valid and enough buffers are available to complete the request such that the first logic may employ the filtering pipe to complete the request.

5. The method of claim 4 wherein:
responding to the first logic based on at least one of whether the request is valid and enough buffers are available to complete the request includes setting a state of the first logic based on at least one of whether the request is valid and enough buffers are available to complete the request; and
responding to the reissued request based on the response to the first logic that is based on at least one of whether the request is valid and enough buffers are available to complete the request includes responding to the reissued request based on the state of the first logic.

6. The method of claim 4 wherein responding to the reissued request based on the response to the first logic that is based on at least one of whether the request is valid and enough buffers are available to complete the request includes at least one of:
issuing a response to the device master to reissue the request at a later time;
issuing a response aborting the request; and completing the request.

7. The method of claim 6 wherein:
the request is a request to read data from memory; and
completing the request includes transferring the entire data between the memory and device master without preemption.

8. The method of claim 6 wherein:

the request is a request to write data to memory; and completing the request includes transferring the data between the memory and device master while allowing the data transfer to be preempted based on a predetermined value.

9. An apparatus for processing a request, comprising:

a memory;

a device master;

a storage controller, including first logic operating in a first clock domain, second logic operating in a second clock domain, and a filtering pipe coupled to said first logic and said second logic, coupled to the device master and memory, and adapted to:

receive a request in the first logic of the storage controller from the device master;

issue a response to the device master to reissue the request at a later time;

notify the second logic of the storage controller of the request;

determine at least one of whether the request is valid and enough buffers are available such that the second logic may complete the request;

program the filtering pipe in the storage controller; and respond to the first logic based on at least one of whether the request is valid and enough buffers are available such that the second logic may respond to the request such that the first logic may employ the filtering pipe to complete the request.

10. The apparatus of claim 9 wherein:

the storage controller is coupled to the device master via a PCI-X bus; and the storage controller is further adapted to receive the request in the first logic of the storage controller from the device master via the PCI-X bus.

11. The apparatus of claim 9 wherein the storage controller is further adapted to:

before responding to the first logic, receive a second request in the first logic of the storage controller from the device master; and issue a response to the device master to reissue the second request at a later time.

12. The apparatus of claim 9 wherein the storage controller is further adapted to:

receive a reissued request from the device master in the first logic; and respond to the reissued request based on the response to the first logic that is based on at least one of whether the request is valid and enough buffers are available to complete the request such that the first logic may employ the filtering pipe to complete the request.

13. The apparatus of claim 12 wherein the storage controller is further adapted to:

set a state of the first logic based on at least one of whether the request is valid and enough buffers are available to complete the request; and respond to the reissued request based on the state of the first logic.

14. The apparatus of claim 12 wherein the storage controller is further adapted to at least one of:

issue a response to the device master to reissue the request at a later time;

issue a response aborting the request; and complete the request.

15. The apparatus of claim 14 wherein:

the request is a request to read data from the memory; and the storage controller is further adapted to transfer the entire data between the memory and device master without preemption.

16. The apparatus of claim 14 wherein:

the request is a request to write data to memory; and the storage controller is further adapted to transfer the data between the memory and device master while allowing the data transfer to be preempted based on a predetermined value.

* * * * *